Patented Oct. 24, 1939

2,177,419

UNITED STATES PATENT OFFICE 2,177,419

PRODUCTION OF EPIHALOHYDRINS

William Engs and Alasdair W. Fairbairn, Oakland, Calif., assignors to Shell Development Company, San Francisco, Calif., a corporation of Delaware No Drawing. Application February 23, 1937, Serial No. 127,195

7 Claims. (Cl. 260—348)

This invention relates to the production of halogenated epoxides from polyhalogenated alcohols containing more halogenated carbon atoms than carbinol groups by reacting the polyhalogenated alcohol with a basic-acting agent, and it more particularly relates to a novel method for effecting the recovery of halogenated epoxides from aqueous alkaline solutions in which they are prepared.

More particularly the invention relates to a practical, economical and continuous process for the technical scale production of epihalohydrins from the corresponding dihalohydrins.

The process of the invention comprises reacting a dihalohydrin with an excess of a basic-acting agent in the presence of water under conditions of temperature and contact time of the reactants at which the dihalohydrin is substantially converted to the corresponding epihalohydrin at a practical rate while undesirable side reactions as hydration and hydrolysis of the epihalohydrin are substantially obviated, and rapidly and substantially completely separating the formed epihalohydrin from the aqueous alkaline reaction mixture, while obviating the occurrence of side reactions, by flash distillation at atmospheric or superatmospheric pressure.

The epihalohydrin recovery step of the process consists in feeding the epihalohydrin-containing aqueous alkaline reaction mixture discharged from the reactor, preferably continuously, into an apparatus containing a heated zone and designed so that the epihalohydrin remains in contact with the alkaline reaction mixture in the heated zone at the recovery temperature for the absolute minimum of time. Many conventional types of apparatus as film evaporators and stripping columns operating under pressures at least equal to atmospheric pressure are suitable. The essential feature being that the epihalohydrin-containing mixture, at a temperature below about 60° C., is brought into contact with a material heated to a sufficiently high temperature so that the epihalohydrin is immediately distilled from the mixture on contact with the heated material. Excellent results have been obtained by employing a stripping column to effect the flash distillation. The reaction mixture is fed into the intermediate portion of a stripping column wherein it is contacted, at atmospheric or superatmospheric pressure, with steam injected into the column below the point of introduction of the epihalohydrin containing mixture. The epihalohydrin, unreacted dihalohydrin and some water are removed from the upper portion of the column, while water, unreacted base and inorganic reaction products (salts) are removed from the base.

An object of the invention is to provide a continuous process whereby substantially complete conversion of the treated dihalohydrin, and substantially complete recovery of the epihalohydrin, are practically and economically effected. In accordance with the process of this invention, much better yields of epihalohydrin are obtained than are possible with the known batch methods of operation which comprise ordinary distillation of the epihalohydrin from the aqueous alkaline solution in which it is prepared. The epihalohydrin is in contact with the aqueous reaction mixture for a long time at the high temperatures necessary to effect removal of the epihalohydrin by ordinary distillation at atmospheric pressure, and, consequently, a large amount of the epihalohydrin is hydrated and hydrolyzed resulting in impracticable yields. Attempts to prevent undesirable side reactions by first neutralizing the reaction mixture and then distilling the epihalohydrin from the neutral mixture by ordinary methods have failed to solve the problem. Hydration of the epihalohydrin is accelerated by hydrogen ions as well as hydroxyl ions. It is difficult, costly and time consuming to provide an exactly neutral mixture prior to distillation. Even if such a neutral solution is obtained, it may become acidic during the distillation due to liberation of small amounts of hydrogen halide. It has been proposed to increase the recovery of the epihalohydrin from the aqueous reaction mixture by batch distillation under subatmospheric pressure, the use of lower pressures permitting distillation of the epihalohydrin while employing lower kettle temperatures. Such vacuum distillation processes fail to give the high yields obtainable by the present process involving separation of the epihalohydrin by flash distillation at atmospheric, or superatmospheric pressure. Vacuum distillation methods or recovery are inherently unsatisfactory; they are difficult to adapt to continuous operation on a technical scale; operating costs are prohibitively high; and equipment costs are excessive.

The process of this invention comprises continuously feeding the dihalohydrin and a basic-acting agent, preferably in the form of an aqueous solution or suspension, in the requisite proportions, into a suitable reaction vessel provided with heating and cooling means and preferably provided with means for agitating its contents as by mechanical stirring. The temperature in the reactor is preferably maintained at or below about 60° C. to prevent destruction of the formed epihalohydrin. The contact time of the reactants in the reactor is controlled by regulating the rate of admittance of the reactants and the rate of discharge of the epihalohydrin-containing reaction mixture. The contact time is dependent upon the temperature employed, the particular dihalohydrin reacted, the particular basic-acting agent used, the concentration of the basic-acting agent, and upon the extent of conversion desired. The contact time and temperature are preferably set so that substantially complete conversion of the dihalohydrin is effected at a practical rate while undesirable side reactions as hydration and hydrolysis of the epihalohydrin are substantially obviated. An excess of the basic-acting agent is preferably maintained in the reactor, and, accordingly the mixture discharged from the reactor may contain, in addition to epihalohydrin, inorganic reaction products (halides) and unreacted dihalohydrin, some of the unchanged basic-acting agent.

The epihalohydrin is recovered from the mixture discharged from the reactor rapidly and completely in a continuous manner, while hydration and hydrolysis of the same is substantially obviated, by continuously feeding said mixture into a stripping column operated under at least atmospheric pressure wherein it is contacted with live steam injected into the column below the point of introduction of the epihalohydrin-containing mixture. On contact of the introduced mixture with the live steam in the column, the epihalohydrin is, without the occurrence of side reactions, rapidly separated from the reaction mixture and removed from the upper portion of the column along with water and any unchanged dihalohydrin which may be present. In the majority of cases the epihalohydrin is removed as an azeotrope with water. Any excess of the basic-acting agent, inorganic reaction products, and water are discharged from the base of the column. The unreacted basic-acting agent may, if desired, be recovered and reutilized in the reactor.

The crude epihalohydrin mixture may be treated as desired to recover the epihalohydrin therefrom in a pure and anhydrous state. The water may be removed by the use of drying agents followed by distillation, or it may be removed by azeotropic distillation with an added third agent. Any unreacted dihalohydrin present in the crude product may be recovered and reintroduced into the reactor.

Stripping columns of the conventional types may be used. In general the stripping column comprises a vertical tube of the requisite size containing suitable plates and/or packed with other contact elements as glass beads, porcelain chips or rings, clay rings, Raschig rings and the like. The stripping column is provided with an inlet at its base for the injection of live steam, with one or more inlets in an intermediate portion of the column, above the point of introduction of the steam, for introduction of the epihalohydrin-containing mixture, with an outlet at the upper portion for removal of epihalohydrin vapors, water vapor and unreacted dihalohydrin vapors, and with an outlet at the base for removal of water, unreacted basic-acting material, and inorganic reaction products.

Our invention is based on the discovery that the side reactions responsible for the low yields of epihalohydrins obtained by the known methods of preparation and recovery are not caused solely by the high temperatures at which the epihalohydrin is in contact but are a function of the contact time as well. Thus, if the contact time of the epihalohydrin with the alkaline reaction mixture is made negligible at the temperature of separation of the former therefrom, higher separation temperatures may be used without substantial destruction of the epihalohydrin. Accordingly, even though the temperature existing in the stripping column at the point of introduction of the epihalohydrin-containing mixture may be sufficiently high to effect substantial destruction of the epihalohydrin if it were in contact with the alkaline reaction mixture for any appreciable time at that temperature, the time of contact in the stripping column is so short that separation of the epihalohydrin is effected before side reactions can occur to any appreciable extent.

The invention is applicable broadly to the conversion of polyhalogenated alcohols containing more halogen atoms than carbinol groups to the corresponding halogenated epoxides. The invention is of particular value as applied to the conversion of dihalohydrins to epihalohydrins. The term "dihalohydrin" used herein and in the appended claims embraces the glycerol dihalohydrins

and their homologues, analogues and suitable substitution products. The dihalohydrins are characterized by the inclusion in their structure of two monohalogenated carbon atoms contiguous to each other, one of which is contiguous to a carbinol group of primary, secondary or tertiary character. For reasons of economy and availability, the dichlorhydrins are treated in preference to the other dihalohydrins.

Representative dichlorhydrins which may be converted to the corresponding epichlorhydrins in accordance with the process of the invention include among others the following:

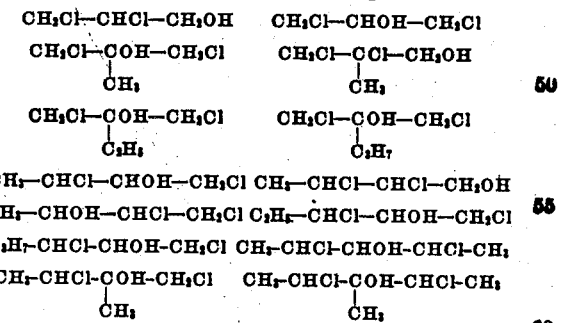

and the like and their homologues, analogues and suitable substitution products.

The dihalohydrins may be converted to epihalohydrins by reaction with a wide variety of basic-acting agents. Particularly suitable basic-agents are the alkali metal and alkaline earth metal oxides, hydroxides, bicarbonates and borates, as well as the alkali metal carbonates. Other suitable metal compounds include the hydroxides of the metals as magnesium, aluminum, copper, nickel, iron, lead, etc. and the basic oxides of such metals. The basic metal compounds are preferably applied as aqueous solutions or suspensions. Excellent results may be obtained by using calcium hydroxide in the form of a lime slurry with water. The dihalohydrin (aqueous or anhydrous) and an excess of the lime slurry are continuously fed into the reactor maintained at a temperature not greater than about 60° C. wherein they are agitated and the dihalohydrin is converted to the corresponding epihalohydrin. The mixture is discharged from the reactor after the desired residence time of from about five to about forty minutes depending upon the temperature, the degree of mixing, the relative amount of lime slurry present, the particular dihalohydrin treated, etc.

The following examples, which are introduced for purposes of illustration and are not intended as limitative, describe a suitable mode of executing the invention. The parts are by weight.

*Example I.*—Glycerine dichlorhydrin and a lime slurry (about 1.5 molal Ca(OH)$_2$) were fed continuously in the proportion of about 258 parts of dichlorhydrin to about 0.70 liter of the lime slurry to a reaction vessel provided with a mechanical stirrer for effecting intimate contact of the reactants. The dichlorhydrin and lime slurry were fed in the proper proportions to the reaction vessel by means of a Hills-McCanna pump. The reactants were contacted in the reaction vessel at about room temperature; the reaction temperature rose due to the occurrence of the exothermic reaction whereby the dichlorhydrin is converted to epichlorhydrin. The temperature in the reaction vessel was kept below 60° C. The rate of admittance of the dichlorhydrin and lime slurry, and the rate of withdrawal of the reaction mixture, were so regulated that conversion of the dichlorhydrin was substantially complete, the withdrawn mixture containing only a small amount of unreacted dichlorhydrin.

The withdrawn mixture comprising epichlorhydrin, water, calcium hydroxide and calcium chloride and, in some cases, a small amount of dichlorhydrin was fed continuously from the reactor into about the central portion of a stripping column, operated under about atmospheric pressure, wherein it was contacted with live steam introduced into the base of the column. The epichlorhydrin and any unchanged dichlorhydrin were distilled from the top of the column in the form of their azeotropes with water while calcium chloride, unchanged lime and excess water were withdrawn from the bottom.

The epichlorhydrin was recovered in a yield of about 94% based on the dichlorhydrin reacted.

To illustrate the advantages of the present process over the processes of the art which comprise ordinary distillation of the epichlorhydrin from the aqueous reaction mixture in which it was prepared, the experiment was repeated as described but the epichlorhydrin was separated from the aqueous reaction mixture by ordinary batch distillation. A yield of only 70.6% of epichlorhydrin was obtained. The loss of the epichlorhydrin was due to its hydration and hydrolysis to monochlorhydrin, glycidol, glycerine and other high boiling products.

*Example II.*—Substantially the same apparatus as described in Example I was used. Dichlor tertiary butyl alcohol

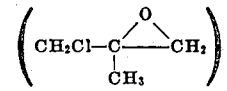

and a lime slurry (about 1.5 molal Ca(OH)$_2$) were fed continuously in the proportions of about 286 parts of dichlor tertiary butyl alcohol to about 0.7 liter of lime slurry to the reaction vessel. The temperature in the reaction vessel was maintained below about 60° C. The contact time of the reactants in the reaction vessel was about 27 minutes.

The mixture discharged from the reaction vessel was continuously fed into a stripping column as described in Example I and the product, beta methyl epichlorhydrin $$\left( CH_2Cl-C\overset{O}{\underset{CH_3}{\diagup\diagdown}}CH_2 \right)$$

stripped therefrom with steam at a pressure at least equal to atmospheric.

About 93% of the applied dichlor tertiary butyl alcohol was converted to beta methyl epichlorhydrin. The remainder of the dichlor tertiary butyl alcohol was recovered unreacted. The yield of beta methyl epichlorhydrin on the converted dichlor tertiary butyl alcohol was about 93%.

Representative epihalohydrins which may be prepared in accordance with the process of the invention are the following:

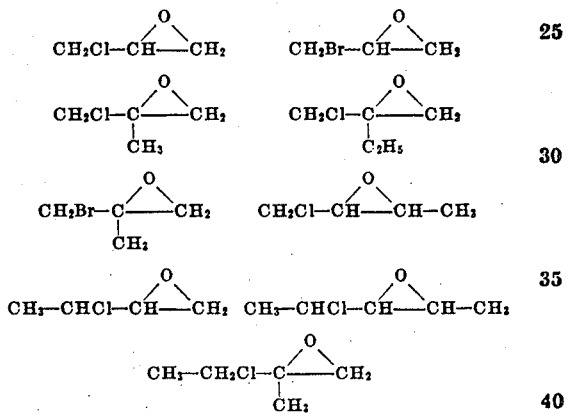

and the like and their homologues, analogues, and suitable substitution products.

The epihalohydrins are useful for a wide variety of purposes. They are solvents for many compounds such as the cellulose esters as cellulose acetate, etc. and they may be used for numerous solvent and extraction purposes. They may be used as extractant agents in the purification of mineral and vegetable oils. They may be used as water-carrying agents in the dehydration of organic compounds by azeotropic distillation. They are useful intermediates in the preparation of a wide variety of useful organic compounds. For example, they may be readily converted to halogenated glycols, glycerols, glycidols, carbonylic compounds, ethers, esters, carboxylic acids, and the like.

While we have described our invention in its preferred embodiment, we desire it to be understood that modifications may be made and that no limitations should be understood therefrom, but the appended claims should be construed as broadly as possible in view of the prior art.

We claim as our invention:

1. A process for the production of an epichlorhydrin which comprises contacting a dichlorhydrin with an excess of a basic metal hydroxide in the presence of water at a temperature not greater than about 60° C. for a time sufficient to effect substantially complete conversion of the dichlorhydrin to the corresponding epichlorhydrin, and recovering the epichlorhydrin by contacting epichlorhydrin-containing mixture directly with a body of live steam at a pressure at least equal to atmospheric whereby the epichlorhydrin is flashed therefrom without substantial loss due to the occurrence of hydration and hydrolysis reactions.

2. A continuous process for the production of an epihalohydrin which comprises continuously feeding a dihalohydrin and a mixture of a basic metal hydroxide with water into a reaction vessel maintained at a temperature not greater than about 60° C. and wherein the dihalohydrin is in contact with an excess of the basic metal compounds for a time sufficient to effect substantially complete conversion to the corresponding epihalohydrin, continuously withdrawing a part of the aqueous alkaline epihalohydrin-containing mixture from the reaction vessel, and continuously bringing the withdrawn epihalohydrin-containing mixture into direct contact with live steam at a pressure at least equal to atmospheric whereby the epihalohydrin is flashed from the mixture without substantial loss due to the occurrence of hydration and hydrolysis reactions.

3. A process for the production of an epichlorhydrin which comprises contacting a dichlorhydrin with an excess of calcium hydroxide in the form of an aqueous lime slurry at a temperature not greater than about 60° C. for a time sufficient to effect substantially complete conversion of the dichlorhydrin to the corresponding epichlorhydrin, and recovering the epichlorhydrin by bringing the aqueous alkaline epichlorhydrin-containing mixture into direct contact with live steam at such a temperature that the epichlorhydrin is flash distilled therefrom at a pressure at least equal to atmospheric without substantial destruction of the epichlorhydrin due to the occurrence of hydration and hydrolysis reactions.

4. A process for the production of beta methyl epichlorhydrin which comprises contacting beta methyl glycerine dichlorhydrin with an excess of calcium hydroxide in the form of an aqueous lime slurry at a temperature not greater than about 60° C. for a time sufficient to effect substantially complete conversion of the methyl glycerine dichlorhydrin to beta methyl epichlorhydrin, and recovering the methyl epichlorhydrin by bringing the aqueous alkaline methyl epichlorhydrin-containing mixture into direct contact with live steam at such a temperature that the epichlorhydrin is flash distilled therefrom at a pressure at least equal to atmospheric without substantial destruction of the epichlorhydrin due to the occurrence of hydration and hydrolysis reactions.

5. In a process for the production of an epihalohydrin by reacting a dihalohydrin with a basic metal compound in the presence of water at a temperature at which the resulting epihalohydrin is substantially stable, the step of recovering the epihalohydrin from the aqueous mixture without substantial destruction due to the occurrence of hydration and hydrolysis reactions which comprises bringing the epihalohydrin-containing mixture into direct contact with a body of live steam at such a temperature that the epihalohydrin is flashed therefrom at atmospheric pressure.

6. In a process for the production of an epichlorhydrin by reacting a dichlorhydrin with a basic metal compound in the presence of water at a temperature at which the resulting epichlorhydrin is substantially stable, the step of recovering the epichlorhydrin from the aqueous mixture while substantially avoiding its destruction due to the occurrence of hydration and hydrolysis reactions which comprises bringing the epihalohydrin-containing mixture into direct contact with a body of live steam at such a temperature that the epihalohydrin is flashed therefrom at a pressure at least equal to atmospheric.

7. A continuous process for the separation of an epichlorhydrin from an aqueous alkaline mixture containing the same which comprises continuously contacting the mixture with live steam at a pressure at least equal to atmospheric whereby the epichlorhydrin is flashed therefrom without substantial loss due to the occurrence of hydration and hydrolysis reactions.

WILLIAM ENGS.
ALASDAIR W. FAIRBAIRN.